United States Patent [19]

Hamaekers

[11] Patent Number: 4,773,634

[45] Date of Patent: Sep. 27, 1988

[54] HYDRAULICALLY DAMPED ELASTIC MOTOR UNIT

[75] Inventor: Arno Hamaekers, Hemsbach, Fed. Rep. of Germany

[73] Assignee: Firma Carl Freudenberg, Weinheim, Fed. Rep. of Germany

[21] Appl. No.: 139,157

[22] Filed: Dec. 21, 1987

Related U.S. Application Data

[63] Continuation of Ser. No. 774,178, Sep. 9, 1985, abandoned, which is a continuation of Ser. No. 512,141, Jul. 8, 1983, abandoned.

[30] Foreign Application Priority Data

Jul. 9, 1982 [DE] Fed. Rep. of Germany ....... 3225700

[51] Int. Cl.⁴ ............ F16F 15/04; B60G 15/04; F16K 17/26; F16M 13/00
[52] U.S. Cl. ............ 267/219; 248/562; 267/140.1; 137/493
[58] Field of Search ............ 267/219, 140.1, 141, 267/141.4, 113, 136, 35, 64.13, 64.15, 64.27, 64.23; 248/562, 636, 559, 632, 634, 638; 180/300, 312; 123/192 R, 195 A; 251/120, 126; 137/843, 849, 859, 493, 493.9

[56] References Cited

U.S. PATENT DOCUMENTS

| | | | |
|---|---|---|---|
| 2,941,544 | 6/1960 | Péras | 137/859 X |
| 3,245,426 | 4/1966 | Kreuter et al. | 137/859 X |
| 3,490,488 | 1/1970 | Grist | 137/849 X |
| 3,811,466 | 5/1974 | Ohringer | 137/493 |
| 4,045,009 | 8/1977 | Pees | 137/859 X |
| 4,159,091 | 6/1979 | Le Salver et al. | 267/113 X |
| 4,416,445 | 11/1983 | Coad | 267/140.1 X |
| 4,422,779 | 12/1983 | Hamaekers et al. | 267/140.1 X |

FOREIGN PATENT DOCUMENTS

| | | | |
|---|---|---|---|
| 0027751 | 4/1981 | European Pat. Off. | 267/35 |
| 0040290 | 11/1981 | European Pat. Off. | |
| 1112598 | 11/1955 | France | |
| 1132284 | 3/1957 | France | 137/843 |
| 0572433 | 1/1958 | Italy | 137/859 |

Primary Examiner—Andres Kashnikow
Assistant Examiner—Robert J. Oberleitner
Attorney, Agent, or Firm—Kenyon & Kenyon

[57] ABSTRACT

A hydraulically damped motor mount comprises a bearing plate, annular resilient element and a bottom plate forming a working space which is connected through a choke opening to a liquid-filled equalization space of variable volume. A partition formed from a soft-elastic material is provided between the two spaces. The partition forms a seal at its circumference. The partition is provided with at least one cut which severs the partition substantially without removal of material. This cut provides a breakthrough for hydraulic liquid to flow through the partition between the working space and the equalization space when a selected value of hydraulic pressure is exceeded.

9 Claims, 3 Drawing Sheets

HYDRAULICALLY DAMPED ELASTIC MOTOR UNIT

This application is a continuation, of application Ser. No. 774,178, filed Sept. 9, 1985, now abandoned, which is a continuation, of application Ser. No. 512,141, filed July 8, 1983, now abandoned.

FIELD OF INVENTION

This invention relates to a hydraulically damped elastic or rubber mount for vibrating equipment. More particularly, this invention relates to a hydraulically damped elastic or rubber motor mount having a bearing core, an annular rubber or elastic resilient element and a bottom plate which surround a working space which is filled with a hydraulic liquid. The working space is connected through a choke opening to a hydraulic liquid-filled equalization space which is of variable volume. A partition member, fabricated from a soft-elastic material and having partial regions independently movable of each other, is provided between the working space and the equalization space. A cutout is provided in the partition.

BACKGROUND OF THE INVENTION

DE-OS No. 27 27 244, FIGS. 20/21, discloses a rubber motor mount. This motor mount has a circular partition fabricated from a rubber-elastic material which has a centrally arranged circular choke opening. The partition is spaced a radial distance from a cutout contained in the bottom plate. The passage opening between the working space and the equalization space caused by this radial spacing has a considerably larger cross-section than the choke opening. At small vibration amplitudes, substantially no hydraulic liquid passes through the choke opening and the passage opening. At large vibration amplitudes, the partition rests against one of the two stop grids and forms a seal. The initial good insulating effect with respect to introduced vibrations then becomes a damping effect which is desired, e.g., for the suppression of the sputtering motions of a mounted internal-combustion engine. However, the development of considerable noise by the rubber bearing must be tolerated.

In some regions, the partition has a greater thickness than in other regions. Contact of the partition against the grids results from the independent mobility of the partial regions. The resulting stress on the rubber-elastic partition can lead to its early distruction. The desired goal of improving the comfort of a passenger in, e.g., an automobile is achieved only to a small degree. An increasing pressure rise in one of the two spaces leads to a stepwise reduction of the choke coss-section available.

French Pat. No. 11 12 598 discloses a partition fabricated from an elastic material which is fixed in a piston and which has cutouts which expand when large amounts of liquid pass through. The cutouts are circular and the partition rests against support grids on both sides. Both measures cause a strong progressive damping behavior. The partition cannot assume the task of sealing.

OBJECT OF THE INVNETION

It is an object of the present invention to develop an improved hydraulically damped rubber or elastic motor mount which is especially useful for mounting an internal-combustion engine in a motor vehicle. It is another object of the present invention to provide a hydraulically damped rubber motor mount which has an increased frequency and amplitude range.

It is a further object of the present invention to provide a hydraulic damped rubber motor mount which obtains a good damping effect in damping low-frequency vibrations and which has a good insulating effect at high-frequency vibrations from about 30 Hz or greater. It is yet another object of the present invention to provide a hydraulically damped rubber motor mount which reduces noise development and has a substantially extended useful life.

These and other objects will become apparent from the following description and claims in conjunction with the drawing.

SUMMARY OF THE INVENTION

In accordance with the present invention, there is provided a hydraulically damped rubber or elastic mount for vibrating equipment having a working space and a variable volume equalization space which are filled with hydraulic liquid. A thin circular partition member is disposed between the working space and the equalization space. The outer circumferential region of the partition forms a seal between the working space and the equalization space so substantially no hydraulic liquid flows between the working space and the equalization space around the outer circumference of the partition. The partition is provided with at least one cut through its thickness which is made essentially without removal of material. Hydraulic liquid can sever the cut and thereby flow through the partition.

BRIEF DESCRIPTION OF THE DRAWINGS

In the drawings forming part hereof.

In the figures of the drawings, like parts are indicated by like reference numerals.

DESCRIPTION OF THE PREFERRED EMBODIMENTS

In order to afford a more complete understanding of the present invention and an appreciation of its advantages, a description of the preferred embodiments is presented below.

Figure 7:
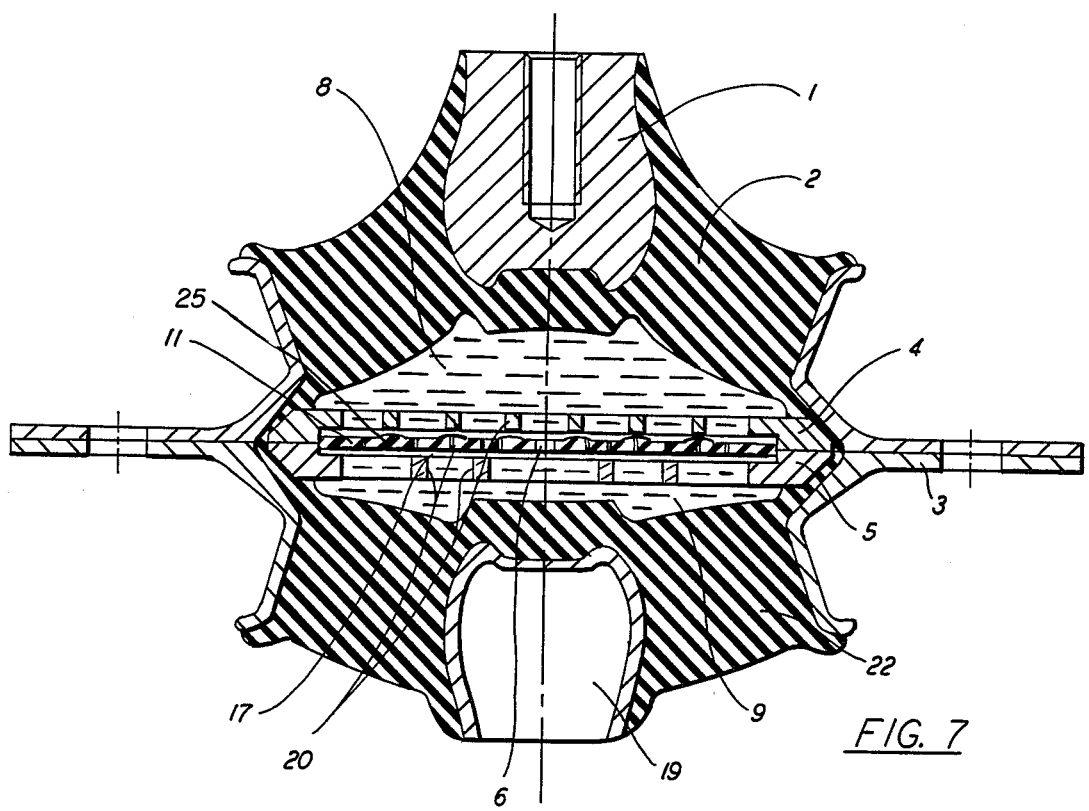
FIG. 7 is a cross-sectional view of a hydraulically damped rubber motor mount in accordance with another embodiment of the present invention which is similar to the embodiment of FIG. 1 and wherein the choke opening passes through the partition member and wherein the equalization space is bounded by an annular resilient member.

The partition 11 preferably comprises a thin, generally flat, member fabricated from a soft-elastic material such as, e.g., rubber with a Shore A hardness of about 40 to 65. The thickness of the partition 11 is preferably 0.2 to 5 mm. One or both surfaces of the partition may be provided relief-like structures 25 (FIG. 7). The relief-like structure on the surface of the partition would have a very small depth, e.g., 0.2 to 1.0 mm. This relief-like structure may comprise bumps and/or ribs which are spaced from each other or merge into each other and which are integrally formed from the partition material. The relief-like structure dampens the impact of the partition 11 upon contact with the grids of choke plates 4, 5. They also facilitate separation of the partition 11 from the choke plates 4, 5 when the partition 11 oscillates in the cavity between choke plates 4, 5.

In most rubber motor mount constructions, the partition 11 has a circular shape. The partition easily oscillates with little play in the cylindrical bore hole formed in bottom plate 3 which extends parallel to the direction of the vibrations introduced into the mount. An appreciable amount of leakage liquid cannot pass the partition in the region of the gap so formed.

It is also possible to connect the partition 11 in an axially movable manner to the cylindrical cutout of the bottom plate 3 by a transition piece of diaphragm-like design (not illustrated). The thickness of such a diaphragm-like transition piece cannot fall below a certain minimum thickness because of strength requirements. This has an adverse effect on the ease of the mobility of the partition and therefore, on the operating behavior of the rubber motor mount. This is especially true for small motor mounts. For light-weight designs as required, for instance, for equipping motor vehicles, the embodiment of a motor mount, in accordance with the invention, having a "floating" partition is preferred. Furthermore, such a design can be produced more cost-effectively, for instance, by stamping-out the partition from a wide web of thin material.

The choke opening connecting the working space 8 in fluid communication with the equalization space 9 can pass through the partition and/or the solid peripheral regions of choke plates 4, 5. In principle, there is no functional difference. The stiff and compact design of the bottom plate, however, makes it possible to detail the choke opening more precisely. For instance, there can be more accurate setting of precise dimensional relationships between the diameter and the length of the choke opening which is of substantial importance with respect to obtaining a defined damping and insulating behavior for the hydraulically damped motor mount.

Referring particularly to FIGS. 2 to 6, the partition 11 is subdivided into partial regions 15, 16 by at least one cut 14 made through the thickness of the partition which is generated without, or with only a minimum amount of material removal. The partial regions 15, 16 may have a different size and, if the partition is fabricated from a material with a specific gravity that differs from that of the hydraulic liquid, a different motion behavior of the partial sections results which assists in the avoidance of pressure peaks.

Whereas the weight of the individual partial regions 16 of the partition, each considered by itself, decreases as the third power of the size, the corresponding area of the partial region subjected to pressure is reduced only by the second power. Therefore, the individual partial regions 15, 16 are accelerated at different rates if the entire partition is acted upon by a uniform pressure. This has a positive effect on avoiding cavitation phenomena. Therefore, the service life of the motor mount is increased and a reduction of operating noise at low frequencies is achieved.

In vibrations having a large amplitude with low frequency are introduced, the pressure acting on the partition 11 increases with increasing frequency. This pressure increase is counteracted, however, by the increasing passage of hydraulic liquid through the choke opening. This reaches its optimum when a limit pressure is reached. Thereafter, a decrease in the volume of liquid passing through the choke opening occurs which is compensated, in accordance with the present invention, by the cut 14 in partition 11 which opens to form a slot. Accordingly, the choke cross-sectional area available is subject to a continuous increase as a function of the pressure difference available between the working space 8 and the equalization space 9. In accordance with the present invention, there is a distinct increase in the frequency and amplitude range for which a good damping effect is obtained while avoiding the well-known elastic stiffening which is disturbing if the cross-section of the choke opening is constant. Sputtering motors of an engine when driving over uneven ground can thus be effectively suppressed. Therefore, the rubber or elastic motor mount, in accordance with the present invention, is particularly well suited for the support of an internal-combusion engine in a motor vehicle.

The grids 20 of the choke plates 4, 5 are arranged parallel to the surface of the partition, and the ratio of their mutual spacing with the thickness of the partition 11 is preferably 1.2 to 1.8. Underdesirable high final velocities are avoided by observing this ratio as well as the danger of mutual canting of partial regions 16 of the partition 11 in the event of extremely different displacements.

The grids 20 may be designed symmetrically or asymmetrically and may be related to the partition 11 with mirror symmetry or offset. The partition may have a vertical cut which is a straight line or a modified cut. By a modified cut is meant that the partition cut may have a uniform or nonuniform curved design; the cut may bend off or extend at an angle with respect to the surface of the partition, and/or the cut may have an asymmetrical relationship with respect to the recess. The use of modified cuts in the partition 11 results, like the use of grids with differently-sized passages, in a different liquid permeability in both directions. This effect can be increased substantially by combining several of these features.

In addition, several cuts 14, of which each may be of different design, can be related to one another in a pattern. One pattern comprises mutually parallel cuts 14 which have a mutual spacing which is at least as large as the thickness of the partition 11. A partition having such a design can be obtained in a simple manner by punching the partition from a web of rubber or plastic material having a plane surface or a surface having a relief-like profile through which correspondingly arranged cuts are made. The stamped disc or partition is supported between the grids in such a manner that at least one cut is associated with at least one grid opening.

The cut 14 of partition 11 may be also arranged at a uniform distance from the edge of the partition. In this embodiment, the individual partial regions are located concentrically inside each other when the partition 11 has a circular design. The cuts 14 may be interrupted by narrow bridges of solid material which substantially facilitates the operating reliability and the assembly.

The shortest length of the cut is limited by a value which corresponds to three-times the thickness of the partition. The maximum lenth of a cut is not limited as long as it is assured that the areas defined by the cut, which recede from each other when the partition bulges when pressures are greater than the limit pressure, moved back into their original position when the direction of hydraulic liquid flow is reversed. This criteria is complied with, as a general rule, when the length of a cut is up to a maximum of 20-times the thickness of the partition. Larger ratios require individual checking of the operating reliability for a particular design. They have no effect on the choke effect obtained because the latter is exclusively a question of the opening cross-section and, therefore, the prevailing hydraulic pressure. Different lengths are automatically equalized to this extent by a different enlargement of the slot.

Straight-line cuts can frequently be more easily made, but a spiral design is also possible. In this case, the opposite partial regions can be connected to each other by narrow bridges of solid material for the reasons mentioned above.

Illustrative embodiments of the present invention are explained in the following in greater detail with the reference to the drawings.

Figure 1:
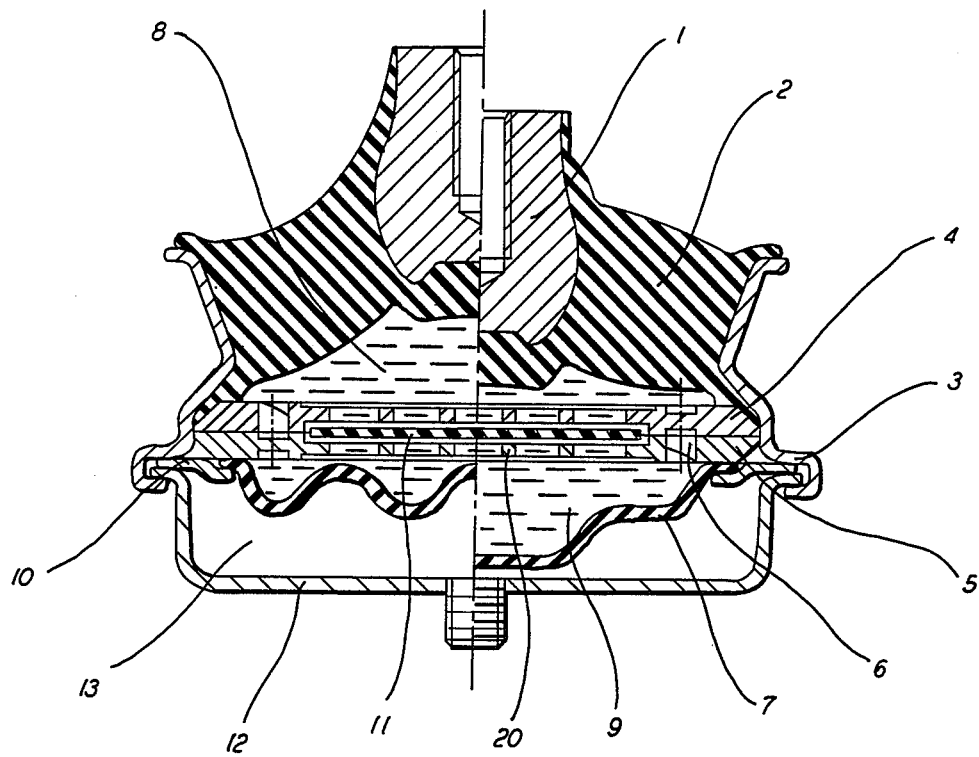
FIG. 1 is a cross-sectional view of a hydraulically damped rubber motor mount in accordance with one embodiment of the present invention wherein the equalization space is bounded by a rolling diaphragm and the choke opening is arranged in the bottom plate.

The hydraulically damped rubber motor mount, in accordance with the present invention as illustrated in FIG. 1, comprise a bottom plate 3 which is connected to a bearing core 1 by vulcanization of resilient rubber element 2 which has a hollow cone-like shape. The bottom plate 3 comprises a deep-drawn sheet-metal part which encloses in the lower part the choke discs 4 and 5 as well as the clamping plate 10 and the bottom cap 12. The grid openings in the upper choke disc 4 may have, for example, a diameter of 8 mm, and the grid openings in the lower choke disc 5 may have, for example, a diameter of 12 mm. All parts are firmly connected by rolling or crimping over the bottom plate 3.

The choke discs 4 and 5 each contain part of the cross-section of the spiral choke opening 6 which connects the working space 8 and the equalization space 9 in fluid communication. By a mutual twist of the two choke discs 4 and 5, the length of the choke opening can be set to a definite desired measure. Both choke discs may be fabricated, e.g., from a zinc die-casting and exhibit a great dimensional accuracy.

In the central region, the choke discs 4, 5 form a cylindrical recess in which the partition 11 is supported without appreciable radial play. The axial mobility of the partition 11 is limited by grids 20. The latter may have, for example, a mutual spacing of 2.1 mm when the thickness of the partition 11 is 1.55 mm. All edges are rounded.

The portion of the partition associated with grid openings may be, e.g., 53% and the length of the cuts may be, e.g., 7 mm. This partition may be fabricated from, e.g., a soft rubber with a Shore A hardness of 45 and may have superficial bumps on both flat surfaces.

The whole diameter of the partition has an open share of 53% and is approximately 7 mm. The partition may be fabricated from, e.g., a soft rubber with a Shore A hardness of 45 and may have superficial bumps on both flat surfaces. The diameter is 43 mm.

The partition is subdivided by a cut 14 which extends parallel to the outside circumference and separates it vertically, into an inner partial region 15 and an outer partial region 16. (See FIG. 2). The cut 14, which is interrupted on two opposite sides by narrow bridges of material, may have, for example, a diameter of 32 mm.

The rolling bellows 7 are fixed and sealed by the clamping plate 10. These bellows 7 are fabricated from a preformed rubber sheet which is designed so that with a static load, the bottom region of the bellows 7 occupies a central position in the equalization space 9. If the bearing plate 1 has an extreme inward or outward excursion, the extreme positions of the bellows 7 are illustrated in FIG. 1 on both sides of the center line. Therefore, neither the bottom cap 12 nor the choke disc 5 are contacted by the rolling bellows 7 when moved under design operating conditions.

The bottom cap 12 has a vent opening 13 through which air can escape if the bearing core 1 makes an inward excursion. Accordingly, the equalization space 9 is free of overpressure under design operating conditions.

The hydraulically damped rubber mount illustrated in the embodiment of FIG. 1, is particularly useful for the support of an internal-combustion engine. It will be apparent that there will be other uses. The engine is bolted to the bearing core 1. The bottom cap 12, via the threaded bolt located at the bottom cap 12, is bolted to a support structure provided which may be, for instance, the body of a motor vehicle.

In the case of large magnitude engine vibrations (low frequency), such as are caused, for example, by travelling over uneven ground, large inward and outward resilient excursions of the bearing core 1 occur. During such operation, there are alternating contacts of the partition 11 against the grids 20 of the choke discs 4 and 5 which limit the motion of the partition. The volume of liquid displaced from the working space 8 flows, in this case, through the choke opening 6 and then increasingly through the partition 11 via the cut 14 which is enlarged by the pressure of the liquid to form a slot or gap. The wideband damping effect obtained thereby prevents stiff support of the engine itself and thereby the generation of vibrations which are perceived as disagreeable. The rubber motor mount of the invention exhibits has neither disturbing noise nor cavitation phenomena.

If engine vibrations of higher frequency and smaller amplitude occur, the volume of liquid passing through the choke opening 6 and the partition through the constricting cross-section is reduced. As a result, a reduction of the choke effect comes about and this results in increasing the decoupling of the vibrating engine from the bottom plate, i.e., there is good insulation of vibration. For instance, booming vibrations which can occur at high engine speeds, are not substantially transmitted to the vehicle body. In this case, disturbing noises or cavitation phenomena are not observed in the rubber motor mount of the invention filled with a conventional hydraulic liquid. Detrimental effects do not occur even under extreme operating conditions.

Figure 2:
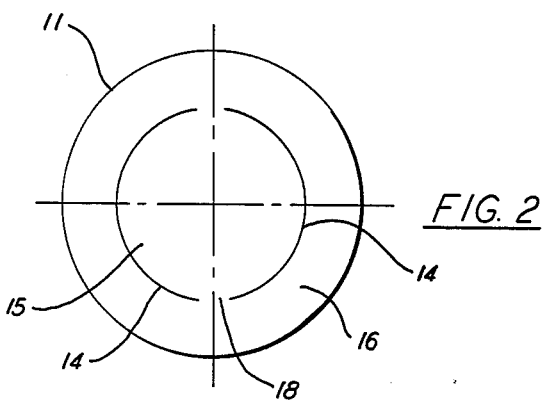
FIGS. 2 to 6 are top views of partition members in accordance with the present invention for use in the motor mount of FIG. 1.

The partition used in a motor mount according to the embodiment of the invention illustrated in FIG. 1 is illustrated in FIG. 2 in a top view. The cut 14 has a constant distance from the edge of the partition 11 which is bounded by a circle. The cut 14 is interrupted on opposite sides by a narrow bridge 18, the width of which corresponds approximately to 3-times the thickness of the partition. The partial regions 15 and 16 have different sizes.

Figure 3:
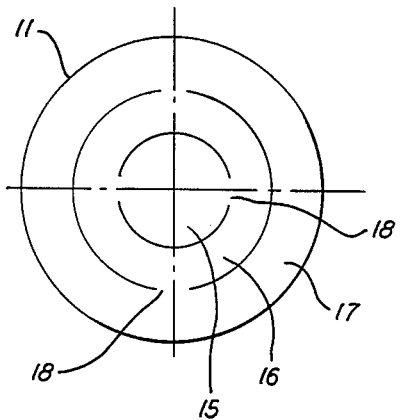

FIG. 3 corresponds substantially to FIG. 2 except a triple division into the partial regions 15, 16 and 17 has been made in the partition by two cuts concentrically located inside each other. The bridges 18, which interrupt each cut on opposite sides of the partition, are related to the bridges 18 of the next following cut at an angle of 90°.

Figure 4:
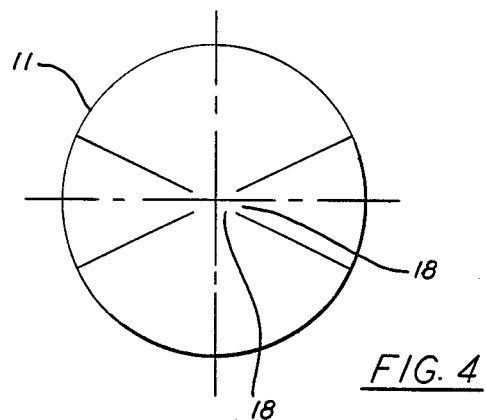

FIG. 4 shows an embodiment of the invention in which four individual cuts in the partition extend radially inward, starting at the outer periphery of the partition. The cuts subdivide the partition into partial regions of different size.

Figure 5:
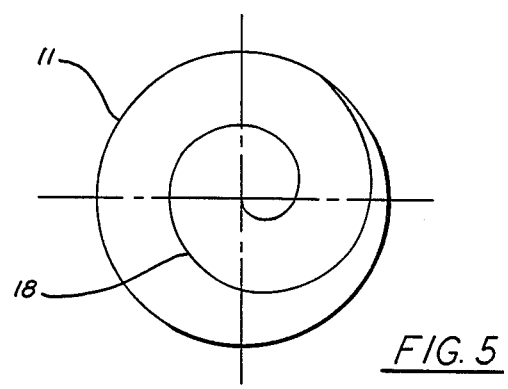

FIG. 5 illustrates an embodiment of the invention wherein the circularly bounded partition is divided by a spiral cut 18 into partial regions of different sizes.

Figure 6:
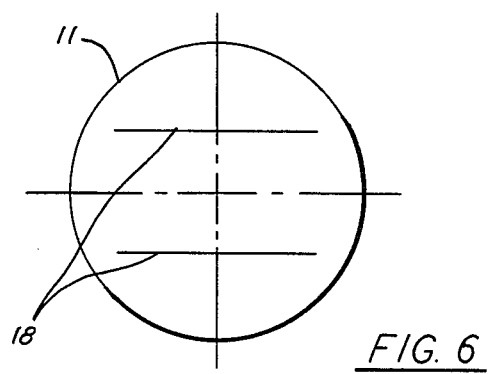

FIG. 6 illustrates an embodiment of the invention wherein two straight mutually paralled cuts 18, which serve the purpose described herein, do not reach the circumference of the partition. The partial regions, which are opposite each other on both sides of the cuts, have different sizes.

FIG. 7 illustrates an embodiment of the present invention similar to FIG. 1 where the choke opening 6 is not arranged in the choke discs 4, 5, but rather in the partition 11. The choke opening 6 has cylindrical shape and may have, e.g., a diameter of 7 mm.

The equalization space 9 is elastically pretensioned, contrary to the embodiment according to FIG. 1, by a resilient ring-like structure 22. Ring-like structure 22 may be fabricated from rubber or another elastomer material and is firmly connected to the bottom part 3 and the bottom socket 19 by vulcanizing. In the embodiment of the invention illustrated in FIG. 7, contact of choke discs 4, 5 is unlikely during an extreme inward excursion of the bearing core 1 or the bottom sleeve 19.

Figure 8:
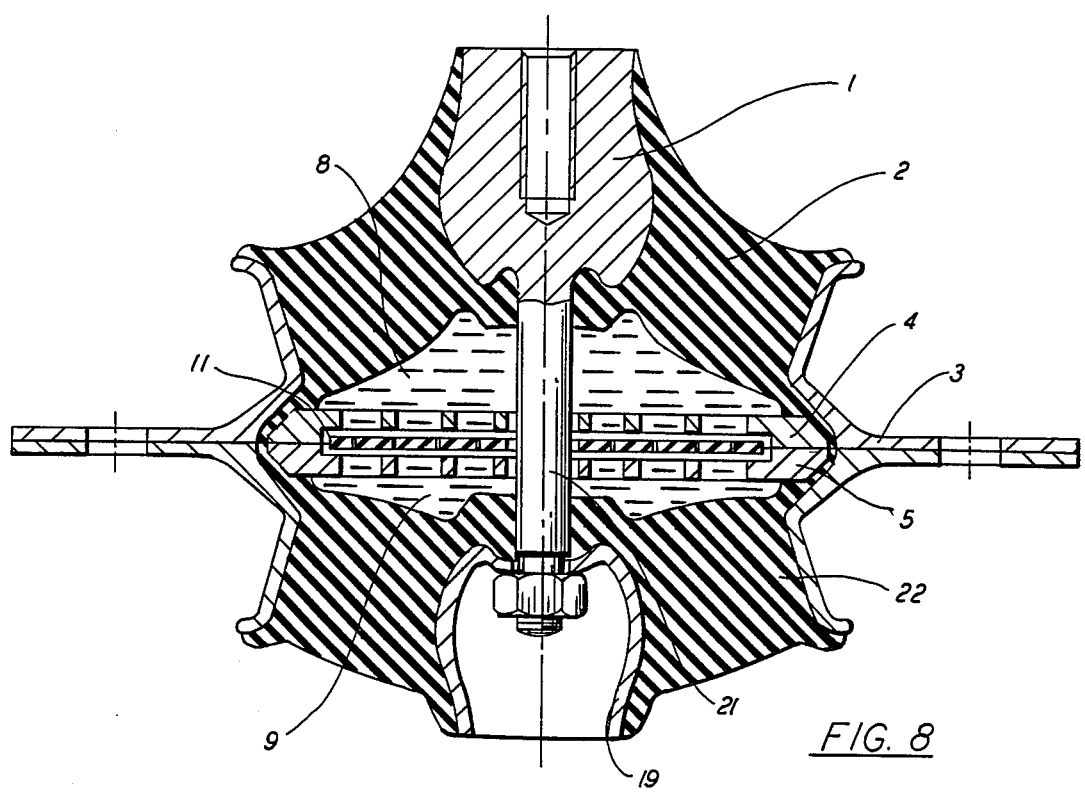
FIG. 8 is a cross-sectional view of a hydraulically damped rubber motor mount in accordance with still another embodiment of the present invention which is similar to the embodiment of FIG. 1 wherein a pin connects the bearing plate and the bottom core of the mount and is thereby cornected to the resilient ring-like member bounding the working space and the resilient ring-like member bounding the equalization space.

FIG. 8 illustrates an embodiment of the present invention similar to FIG. 7 wherein the bottom socket 19 and the bearing core 1 are rigidly connected by a bolt 21. The equalization space is thereby functionally connected parallel to the working space. This makes such a design particularly suitable for applications, in which there is no unidirectional preload such as, for example, in the lateral support of a vibrating equipment. The choke opening is formed by a gap between the partition and the circumference of the bolt 21.

Although preferred embodiments of the present invention have been described in detail, it is contemplated that modifications may be made within the spirit and scope of the invention by those skilled in the art.

What is claimed is:

1. In a hydraulically damped elastic mount for vibrating equipment comprising:
   a bearing core, an annular elastic member and a bottom plate enclosing a working space for receiving hydraulic liquid;
   means for providing a variable volume equalization space in association with said working space, with said working space and said equalization space forming an enclosed receptacle for retaining received hydraulic liquid;
   two grid plates disposed between said working space and said equalization space with a first grid plate adjacent said working space and a second grid plate adjacent said equalization space, and with each grid plate having a plurality of grid openings and wherein said grid plates are arranged to have a recess therebetween;
   a thin partition member having an outer periphery and wherein said partition member is fabricated from a soft elastic material and is disposed in said recess between said grid plates for restricting fluid communication between said working space and said equalization space through said grid openings;
   means for providing a permanently open choke opening fluid passage between said working space and said equalization space;
   the improvement comprising:
   means for substantially preventing the flow of hydraulic liquid between said working space and said equalization space around the outer periphery of said partition; and
   said partition is provided with a plurality of cuts through its thickness each of which severs said partition without substantial removal of material with numerous said grid openings having associated therewith at least one cut whereby when the pressure of said hydraulic fluid in said working space is sufficient to force said partition into abutment with said second grid plate adjacent said equalization space and exceeds the pressure of the hydraulic fluid in said equalization space by a selected value, hydraulic fluid breaks through said cuts thereby providing additional fluid communication through said numerous grid openings in a first direction from said working space to said equalization space and when the pressure of said hydraulic fluid in said equalization space is sufficient to force said partition into abutment with said first grid plate adjacent said working space and exceeds the pressure of said hydraulic fluid in said working space by a selected value, hydraulic fluid breaks through said cuts thereby providing additional fluid communication through said numerous grid openings in a second direction from said equalization space to said working space.

2. A hydraulically damped elasic mount for vibrating equipment as recited in claim 1 wherein said cut extends at a constant distance from the outer periphery of said partition.

3. A hydraulically damped elastic mount for vibrating equipment as recited in claim 1 wherein said cut is along a straight line.

4. A hydraulically damped elastic mount for vibrating equipment as recited in claim 1 wherein said cut is spiral shaped.

5. A hydraulically damped elastic mount for vibrating equipment as recited in claim 1 wherein said cut is primarily associated with a grid opening.

6. A hydraulically damped elastic mount for vibrating equipment as recited in claim 1 wherein the grid opening of each of the grids are of different size.

7. A hydraulically damped elastic mount for vibrating equipment as recited in claim 1 wherein the surface of said partition has a relief-like structure on at least one side.

8. A hydraulically damped elastic mount for vibrating equipment as recited in claim 1 wherein the cut goes through said partition at an angle with respect to said partition surface.

9. A hydraulically damped elastic mount for vibrating equipment as recited in claim 1 wherein said partition has a disc-like shape and said means for substantially preventing flow of hydraulic liquid between said working space and said equalization space around the outer periphery of said partition comprises said partition having an area selected to substantially prevent movement of said partition within said recess in the radial direction of said partition and wherein the outer circumferential region of said partition extends beyond said grid openings thereby forming a seal at said outer circumferential region.

* * * * *